(12) United States Patent
Fang (10) Patent No.: US 10,284,283 B2
(45) Date of Patent: May 7, 2019

(54) ACCESS SWITCH NETWORK WITH REDUNDANCY

(71) Applicant: Space Systems/Loral, LLC, Palo Alto, CA (US)

(72) Inventor: Jun Fang, San Jose, CA (US)

(73) Assignee: Space Systems/Loral, LLC, Palo Alto, CA (US)

(*) Notice: Subject to any disclaimer, the term of this patent is extended or adjusted under 35 U.S.C. 154(b) by 68 days.

(21) Appl. No.: 15/267,828

(22) Filed: Sep. 16, 2016

(65) Prior Publication Data

US 2018/0083693 A1 Mar. 22, 2018

(51) Int. Cl.
 *H04B 7/185* (2006.01)
(52) U.S. Cl.
 CPC ......... *H04B 7/18513* (2013.01); *H04B 7/185* (2013.01); *H04B 7/18515* (2013.01); *H04B 7/18519* (2013.01)
(58) Field of Classification Search
 None
 See application file for complete search history.

(56) References Cited

U.S. PATENT DOCUMENTS

| | | | | |
|---|---|---|---|---|
| 4,644,301 A * | 2/1987 | Hecht | | H01P 1/10 330/124 D |
| 5,978,652 A | 11/1999 | Burr et al. | | |
| 6,301,225 B1 * | 10/2001 | Murdock | | H03F 3/58 333/101 |
| 2003/0134595 A1 | 7/2003 | DiCamillo et al. | | |
| 2004/0155725 A1 * | 8/2004 | Kwiatkowski | | H01P 1/12 333/101 |
| 2007/0235299 A1 | 10/2007 | Daneshmand et al. | | |
| 2009/0239529 A1 | 9/2009 | Fenech et al. | | |
| 2014/0225666 A1 | 8/2014 | Kusu et al. | | |

FOREIGN PATENT DOCUMENTS

| | | |
|---|---|---|
| DE | 4203174 A1 | 8/1993 |
| EP | 0 951 149 A2 | 10/1999 |

OTHER PUBLICATIONS

Extended European Search Report dated Oct. 20, 2017 in EP Application No. 17186708.8.
EP Intention to Grant in EP Application No. 17186708.8 dated Nov. 7, 2018.

* cited by examiner

*Primary Examiner* — Faruk Hamza
*Assistant Examiner* — Alan L Lindenbaum
(74) *Attorney, Agent, or Firm* — Weaver Austin Villeneuve & Sampson LLP (57) ABSTRACT

This disclosure provides systems, methods and apparatus for implementing an arrangement of electromechanical switches. In one aspect, the arrangement includes rings of electromechanical switches configured to provide access to communication processing channels and redundancy access rows of electromechanical switches configured to provide access to redundant communication processing channels.

18 Claims, 10 Drawing Sheets

ACCESS SWITCH NETWORK WITH REDUNDANCY

TECHNICAL FIELD

This disclosure relates generally to switch matrices, and more particularly to an arrangement of switches to implement an access switch network with redundancy.

BACKGROUND

Spacecraft for communications and broadcast services can operate in orbit to communicate with a user terminal (or ground device/terminal) by ways of a forward user downlink signal (transmitted by the spacecraft) and a return user uplink signal (transmitted by the user terminal) that communicatively couple the user terminal and the spacecraft. A forward gateway uplink signal and a return gateway downlink signal communicatively couple gateway stations and the spacecraft, so that terminals get two-way access to network services providers via spacecraft and gateway stations. Spacecraft may use an on-board digital processing communication payload or a transparent bent-pipe payload, and multibeam antennas, providing multibeam coverage for terminals.

The payload systems for such spacecraft may include a number of sensors or antenna feeds and a number of communication processing channels including components such as low noise amplifiers (LNAs), frequency down/up converters, filters, etc., as in a return user uplink receive section of the payload, Access to different communication processing channels should be configurable. For example, certain sensors should be connected to communication processing channels per operational requirements with a changing frequency-beam plan, only parts of the antenna feeds need to access the communication processing channels, or the configuration may change with the operational requirements of the spacecraft. The payload systems can also include a number of redundant communication processing channels and components to protect the payload operations from component failures. Both access and redundancy protection (for communication processing channels) are useful in multibeam spacecraft systems where the number of antenna feeds could be very large and the access to a number of communication processing channels can change from time-to-time. In a forward user downlink transmit section of the payload, similar requirements can be expressed for a larger number of transmit feeds to connect to a number of processing channel including HPAs (High Power Amplifier). A certain subset of transmit feeds may need to be connect to the HPAs in a time period, and in other time periods, different subsets of feeds should be connected to the HPAs, and so on, per operational requirements with a changing frequency-beam, and traffic connectivity plan.

A substantial number of switches are necessary to enable the redundancy protection, and also facilitate switching between alternate communication processing channels in cases of device failure. Thus, efficient solutions need to be developed to meet both access and redundancy protection requirements.

SUMMARY

The systems, methods and devices of this disclosure each have several innovative aspects, no single one of which is solely responsible for the desirable attributes disclosed herein.

One innovative aspect of the subject matter described in this disclosure can be implemented in an arrangement of electromechanical switches, the arrangement having L rings of electromechanical switches and one or more redundancy access rows of electromechanical switches configured to provide access to corresponding redundant communication processing channels, the one or more of the redundancy access rows including L electromechanical switches, each of the L electromechanical switches in the one or more redundancy access rows coupled with a set of two corresponding electromechanical switches of the L rings of electromechanical switches, L being two or more.

In some implementations, the one or more redundancy access rows are positioned between consecutive electromechanical switches of each of the L rings of electromechanical switches.

In some implementations, each of the sets of two electromechanical switches corresponds to different rings of the L rings of electromechanical switches.

In some implementations, connections between the L rings are alternatively coupled to the electromechanical switches of at least one of the redundancy access rows.

In some implementations, a first redundancy access row includes a first switch coupled to receive an input from an antenna feed and a second switch coupled to a first redundant communication processing channel.

In some implementations, the first switch is coupled with a switch of a first ring that is coupled to a first communication processing channel, and the second switch is coupled with a switch of a second ring that is coupled to receive an input from an antenna feed.

In some implementations, the electromechanical switches are R-switches.

In some implementations, the electromechanical switches are T-switches.

Another innovative aspect of the subject matter described in this disclosure can be implemented in a system comprising an arrangement of electromechanical switches, the arrangement having outputs coupled with communication processing channels, the arrangement having L rings of electromechanical switches and one or more redundancy access rows of electromechanical switches configured to provide access to corresponding redundant communication processing channels, the one or more of the redundancy access rows including L electromechanical switches, each of the L electromechanical switches in the one or more redundancy access rows coupled with a set of two corresponding electromechanical switches of the L rings of electromechanical switches, L being two or more; and a controller configured to provide control signals to the electromechanical switches to change a routing of a signal received at an input of the arrangement from a communication processing channel to a redundant communication processing channel of the corresponding redundant communication processing channels.

In some implementations, the one or more redundancy access rows are positioned between consecutive electromechanical switches of each of the L rings of electromechanical switches.

In some implementations, each of the sets of two electromechanical switches corresponds to different rings of the L rings of electromechanical switches.

In some implementations, connections between the L rings are alternatively coupled to the electromechanical switches of at least one of the redundancy access rows.

In some implementations, a first redundancy access row includes a first switch coupled to receive an input from an antenna feed and a second switch coupled to a first redundant communication processing channel.

In some implementations, the first switch is coupled with a switch of a first ring that is coupled to a first communication processing channel, and the second switch is coupled with a switch of a second ring that is coupled to receive an input from an antenna feed.

In some implementations, the electromechanical switches are R-switches.

In some implementations, the electromechanical switches are T-switches.

In some implementations, the arrangement further includes a load balancing network configured to balance inactive inputs and active inputs to the arrangement of the electromechanical switches.

In some implementations, the load balancing network is composed of C-switches.

Another innovative aspect of the subject matter described in this disclosure can be implemented in a method comprising receiving, by a controller, data corresponding to positions of electromechanical switches of an arrangement of electromechanical switches, the arrangement having L rings of electromechanical switches and one or more redundancy access rows of electromechanical switches configured to provide access to corresponding redundant communication processing channels, the one or more of the redundancy access rows including L electromechanical switches, each of the L electromechanical switches in the one or more redundancy access rows coupled with a set of two corresponding electromechanical switches of the L rings of electromechanical switches, L being two or more; and generating, by the controller, control signals to adjust configurations of the electromechanical switches to change routing of signals between inputs and outputs of the arrangement.

In some implementations, the electromechanical switches are R-switches or T-switches.

BRIEF DESCRIPTION OF THE DRAWINGS

The included drawings are for illustrative purposes and serve only to provide examples. These drawings in no way limit any changes in form and detail that may be made by one skilled in the art without departing from the spirit and scope of the disclosed embodiments.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the disclosed subject matter, as defined by the appended claims.

DETAILED DESCRIPTION

Specific exemplary embodiments will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The terms "spacecraft", "satellite" may be used interchangeably herein, and generally refer to any orbiting satellite or spacecraft system.

A satellite communications network can include a satellite at an orbital location providing downlink communication with a user terminal (e.g., a user device such as a phone, tablet, laptop, transportation vehicles such as airplanes, trains, ships, etc.) via generation of a forward user downlink signal. The user terminal can provide uplink communication with the satellite via generation of a return user uplink signal.

Figure 1:
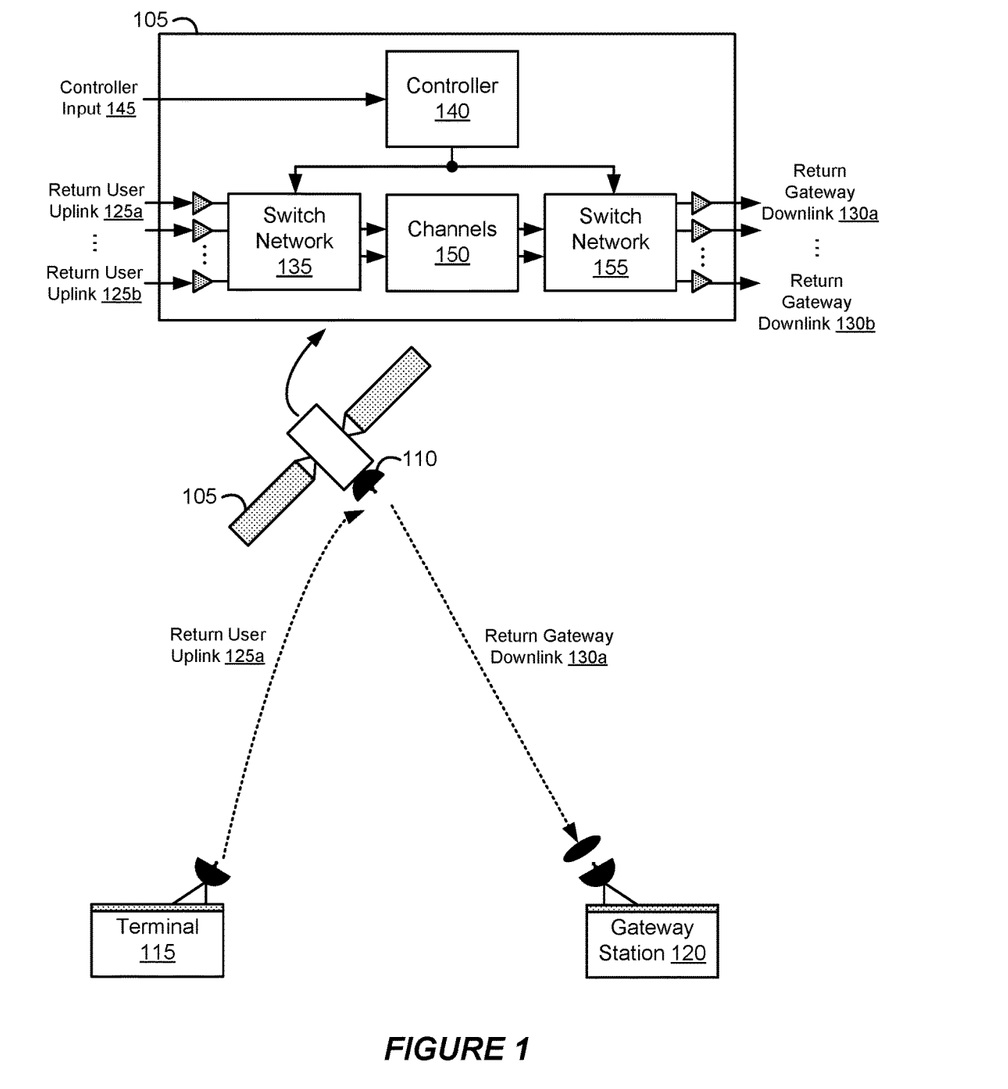
FIG. 1 is an example of a satellite return link payload subsystem including switching functionality for feed to channel access.

In more detail, FIG. 1 is an example of a satellite including a switch network. In FIG. 1, satellite 105 includes several antenna configured as phased array antenna 110 for receiving return user uplink signal 125a from ground terminal 115 and providing return gateway downlink signal 130a to gateway station 120. For example, return user uplink signal 125a can be transmitted by ground terminal 115, received by satellite 105, processed, and then a corresponding return gateway downlink signal 130a can be provided to gateway station 120. Other return user uplink signals (e.g., return user uplink signal 125b) and return gateway downlink signals (e.g. return gateway downlink 130b) can be received or provided, respectively. Additionally, forward user downlink signals and forward gateway uplink signals can be received and/or provided.

Return user uplink signals received by satellite 105 can be provided to communication processing channels 150 (e.g., channels of a channel processor such as circuitry implementing a digital channelizer) including low noise amplifiers (LNAs), frequency down/up converters, filters, channelizer circuits, and other components for processing (e.g., adjusting amplitudes, phases, and other characteristics of the return user uplink signals). Several of the antenna feeds of phased array antenna 110 are configured to receive return user uplink signals. Often, there are more antenna feeds than communication channels. However, since a subset of the antenna feeds provide or receive an active signal (e.g., return user uplink signals 125a and 125b in FIG. 1) at a given time, switch network 135 (as an input switch network of satellite 105) can be configured by controller 140 to route certain inputs (coupled with the antenna feeds) to a smaller number of outputs to communication processing channels 150. The outputs of communication processing channels 150 can then be provided to switch network 155 (as an output switch network and also configured by controller 140) such that the outputs are provided to particular antenna feeds providing forward user downlink signals (e.g., return gateway downlink signals 130a and 130b). In some implementations, additional circuitry may be included, for example, further processing components may be placed following switch network 155 and the antenna feeds.

For example, controller 140 can receive controller input 145 as data from either a ground station or another component within satellite 105 indicating the states, or positions, of switches of switch networks 135 and 155. By changing the positons of the switches using this data, active signals at the input signals (e.g., return user uplink signals) of satellite 105 can be routed via switch network 135 to certain communication processing channels 150 for processing (e.g., the signals can be applied to filters, beamformed including adjusting their phases and amplitudes, etc.). Those processed signals can then be subsequently provided to selected antenna feeds as output signals (e.g., forward user downlink signals, return gateway downlink signals, etc.) via switch network 155.

Figure 2A:
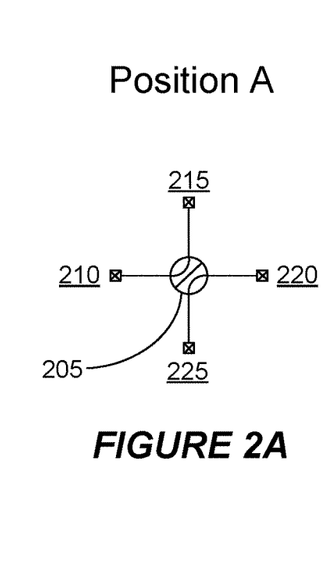
FIGS. 2A, 2B, and 2C show examples of a four port, three channel rotary switch ("R-switch").
Figure 2B:
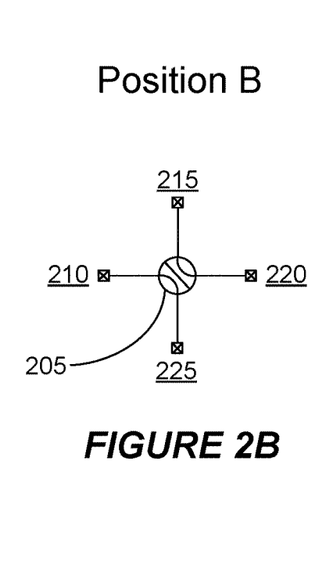
Figure 2C:
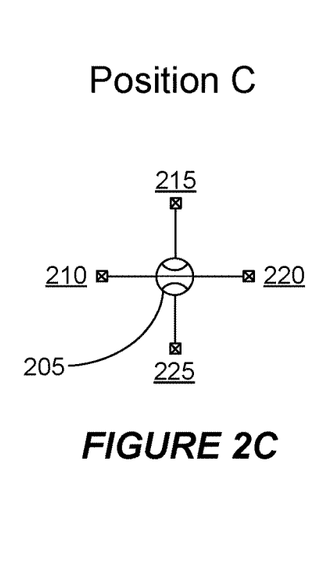

Switch networks 135 and 155 can include arrangements of electromechanical switches. FIGS. 2A, 2B, and 2C show examples of a four port, three channel rotary switch ("R-switch"). The R-switch in FIGS. 2A, 2B, and 2C can include a rotor 205 with an angular position allowing for different connections between the four ports. For example, in FIG. 2A, the angular position of rotor 205 allows ports 210 and 215 to be coupled via a first channel of the R-switch. Ports 225 and 220 are also coupled at that same angular position of rotor 205 in FIG. 2A. This results in two of the three channels of the R-switch being used to couple two pairs of the ports. In FIG. 2B, the angular position of rotor 205 can change, resulting in port 210 being coupled with port 225, and port 215 coupled with port 220. The same channels as in FIG. 2A are being used to couple the two pairs of ports, but since the angular position of rotor 205 has been changed or adjusted (e.g., rotated clockwise or counter-clockwise), this results in a different coupling between those ports. By contrast, in FIG. 2C, the angular position of rotor 205 couples port 210 and 220 using the third channel. This results in ports 215 and 225 being uncoupled with each other and the two other channels of the R-switch being unused. As a result, signals (e.g., microwave energy) can be routed (e.g., transferred) among the ports based on the angular position of rotor 205.

Figure 3:
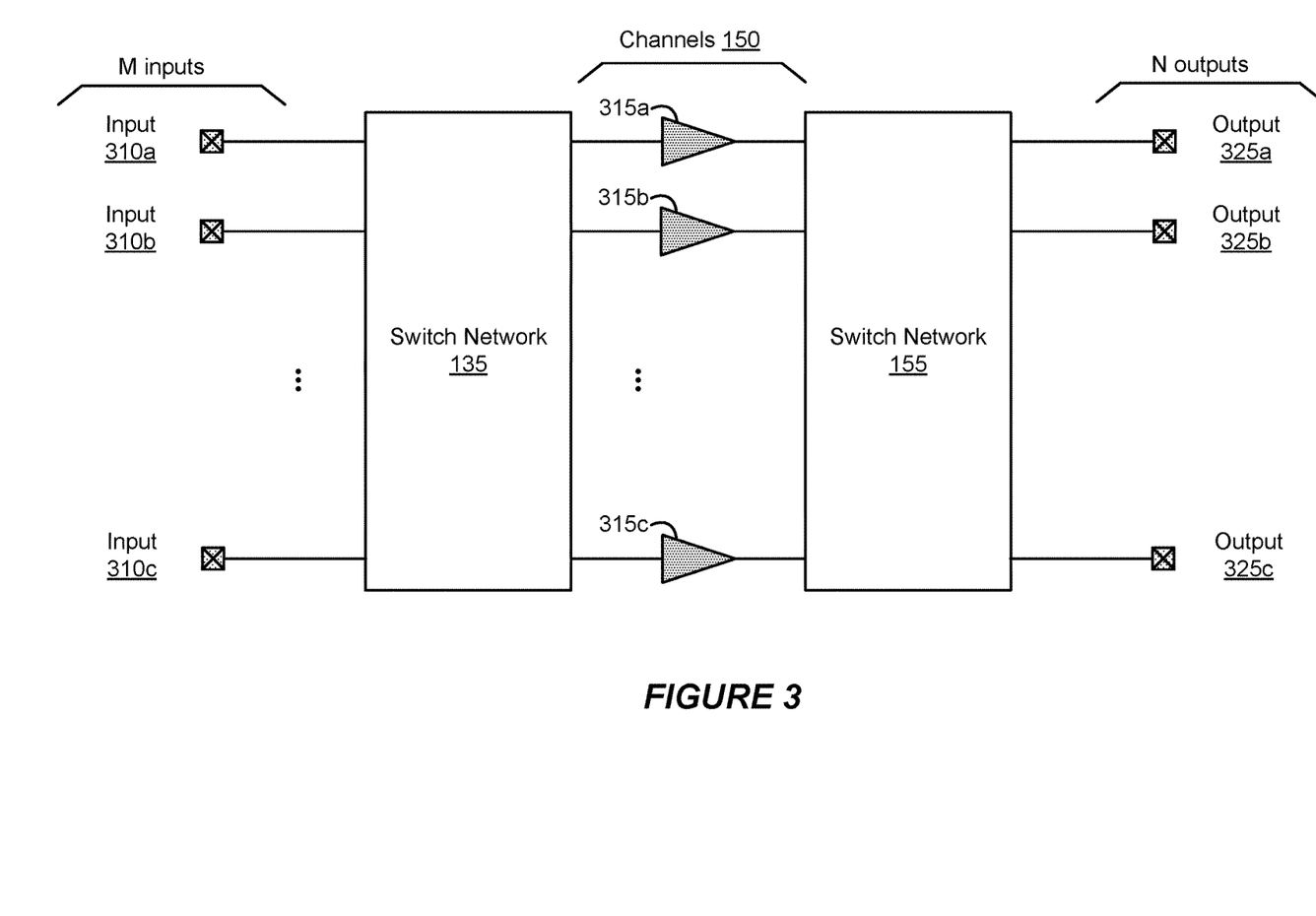
FIG. 3 is an example of the switch network of the satellite of FIG. 1.

FIG. 3 is an example of the switch network of the satellite of FIG. 1. In FIG. 3, switch network 135 is an input switch network providing redundancy and access to channels 150. That is, switch network 135 provides access to channels 150, including redundant channels that can be used in the case of a failure of a component of one of channels 150. Switch network 155 is an output switch network providing access to antenna feeds for forward user downlink signals. Switch networks 135 and 155 can be composed of R-switches. However, in other implementations, T-switches can be used. T-switches include the three channels of R-switches as disclosed above as well as another middle channel (e.g., a fourth channel that would couple ports 215 and 225 in FIG. 2C).

In FIG. 3, an M number of antenna feeds (e.g., providing return user uplink signals) can be coupled with the inputs of switch network 135. An N number of these inputs 310a-c (e.g., the antenna feeds providing active signals) can be routed to an N number of channels 150 (e.g., including low noise amplifiers (LNAs) 315a-c). In some implementations, channels 150 can also include an M-N number of redundant channels. That is, of the M number of inputs, only an N number of them may be active, and therefore, the N number of input signals at the inputs can be provided to an N number of channels. If a component of a channel fails, for example LNA 315b, then one of the N number of input signals can be rerouted to one of the M-N redundant channels, for example, the channel of channels 150 including LNA 315c. The input signal can be re-routed by changing the positions of switches within switch network 135. The N number of channels that were provided active signals and routed to channels 150 can then be routed to an N number of outputs 325a-c by switch network 155.

Figure 4:
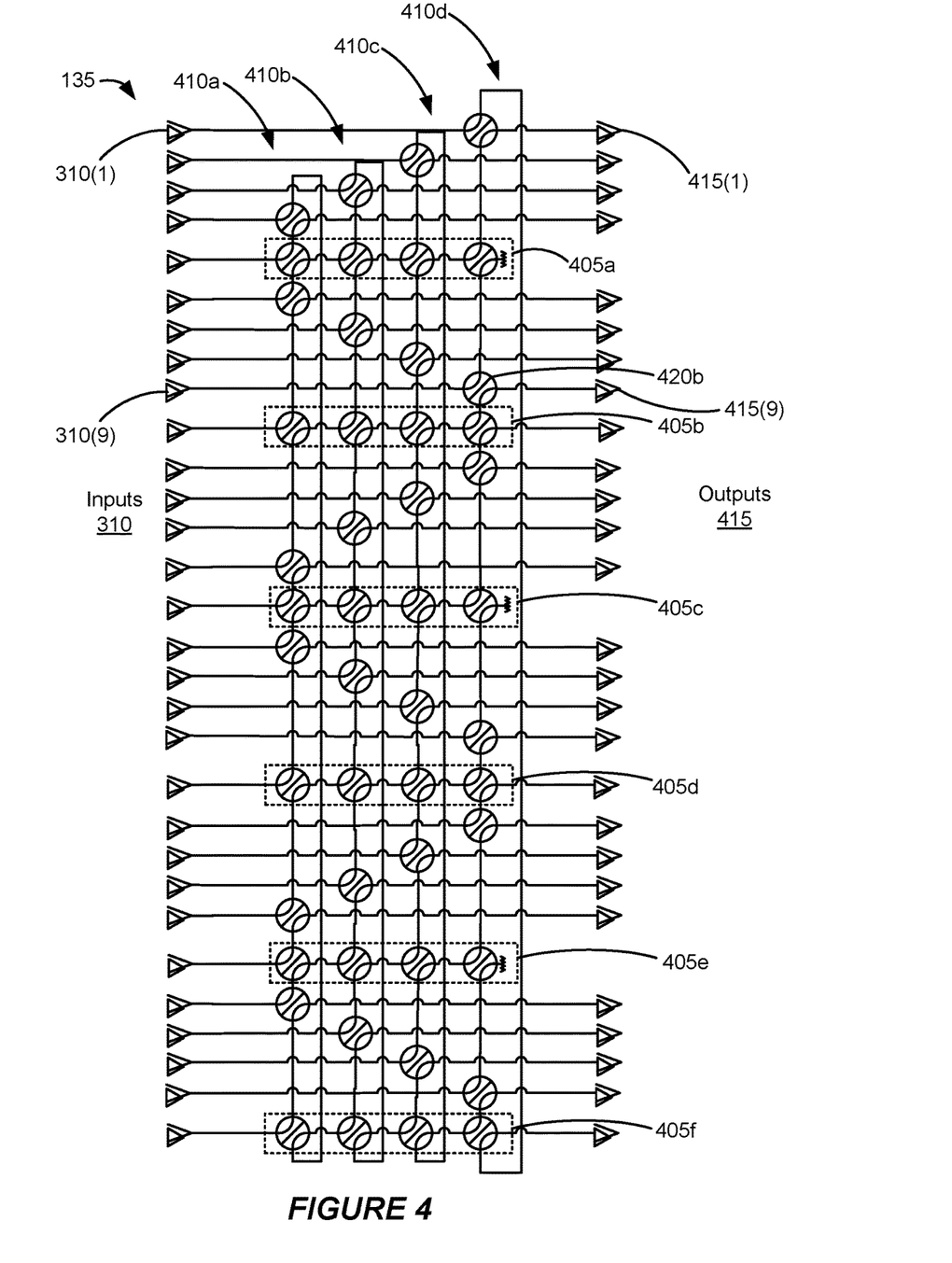
FIG. 4 is an example of an access network of the switch network of FIG. 3.

FIG. 4 is an example of an access network of a switch network of FIG. 3. For example, the switch network in FIG. 4 can be switch network 135 in FIG. 3 and provides both access to different channels 150 (e.g., providing a subset of its inputs to channels 150) including redundant channels. In FIG. 4, switch network 135 includes 30 inputs 310 of which 24 are routed to 24 of outputs 415 using 48 R-switches. In another example, switch network 135 can also be used to implement switch network 155.

In FIG. 4, switch network 135 includes 4 tiers, or rings 410a-d, of switches with some switches providing access to different outputs 415, and therefore, channels 150. The switches of rings 410a-d also receive different inputs 310. Inputs 310 are coupled with antenna feeds and, as previously discussed, some may be active (i.e., providing a return user uplink signal) and others may be inactive. However, some of the switches in switch network 135 are also used to provide routing and access to redundant channels of channels 150 via outputs 415 and may be disposed in a redundancy access row, as discussed below.

For example, in FIG. 4, switches within redundancy access rows 405a-f are groups of switches providing access to redundant communication processing channels of channels 150. The switches of the rings that are not part of the redundancy access rows (i.e., switches of rings 410a-d not within access rows 405a-f) have a first port coupled to one of inputs 310, a second port coupled to one of outputs 415, and a third port and a fourth port, each respectively coupled to a different switch in a different redundancy access row. For example, in FIG. 4, switch 420a of ring 410d is coupled with the first input 310(1) of inputs 310, the first output 415(1) of outputs 415, the fourth switch of redundancy access row 405a, and the fourth switch of redundancy access row 405f. As another example, switch 420b of ring 410d is coupled to input 310(9) of inputs 310 and output 415(9) of outputs 415 (i.e., different inputs and outputs than switch 420a), as well as the fourth switches of redundancy access rows 405a and 405b. The remaining R-switches of ring 410a-d alternatively couple between switches of access redundancy rows 405a-f, as well as with different inputs and outputs in a similar manner. In the illustrated implementation, switches of the redundancy access rows are positioned between consecutive switches that are not in the redundancy access rows.

The number of switches in each of the redundancy access rows can be similar to the number of rings. For example, in FIG. 4, it may be observed that there are four rings 410a-d, there are four switches in each of the redundancy access rows implemented by rows of switches 405a-f (i.e., the same number of switches as the number of rings). That is, if there are an L number of rings, then an L number of switches can be implemented in redundancy access rows 405a-f. Moreover, within each redundancy access row 405a-f, switches are coupled to one or more other switches within the same redundancy access row. For example, regarding redundancy access row 405a, the first switch has a port coupled with a port of the second switch, the second switch also has a port coupled with a port of a third switch, and the third switch also has a port coupled with a port of the fourth switch. Accordingly, the switches of a redundancy access row are serially coupled within the row. Each of the switches in the redundancy access row is also coupled with switches of one of the rings. For example, the first switch in redundancy access row 405a is coupled with two switches of ring 410a. Likewise, the second switch in redundancy access row is coupled with two switches of ring 410b, and so forth.

In FIG. 4, access redundancy rows 405a, 405c, and 405e are terminated (e.g., grounded). As a result, switch network 135 provides access to three redundant communication processing channels at the outputs of the fourth switches of redundancy access rows 405b, 405d, and 405f. However, in other implementations, redundancy access rows 405a, 405c, and 405e can provide access to three redundancy communication channels, and therefore, switch network 135 can provide access to six redundancy communication channels. In some implementations, inputs of inputs 310 with inactive signals can be routed to the terminated redundancy access rows while inputs of inputs 310 with active signals are routed to outputs 415 such that they are provided to channels 150.

In FIG. 4, switch network 135 can route any input to any output, implementing a non-blocking switch network. If a communication processing channel of channels 150 is disabled (e.g., a component is longer properly functioning), then the states of one or more of the switches can be changed such that an input of inputs 310 can be routed to another output of outputs 415 via one of the redundancy access rows 405a-f. For example, if the first input of inputs 310 routes to the first output of outputs 415 (e.g., the switch is positioned as in FIG. 2C), which provides access to a disabled communication processing channel, then one or more of the switches of switch network 135 can be changed such that instead of routing the first input to the first output, the first input can be routed to the output that the fourth switch of redundancy access row 405b provides access to. Additionally, any number of rings may be implemented depending on the number of inputs and outputs desired for switch network 135.

Figure 5:
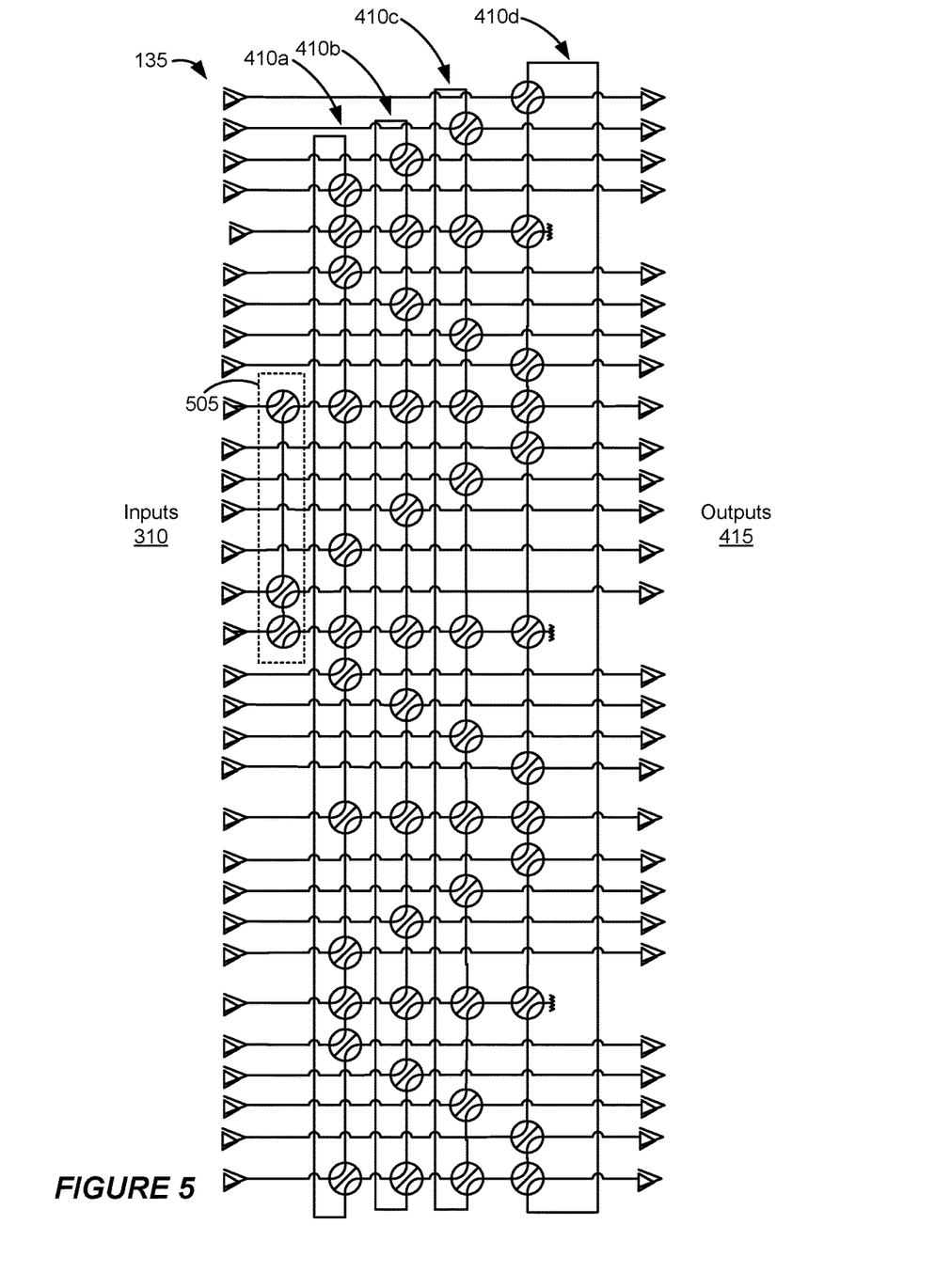
FIG. 5 is another example of an access network of the switch network of FIG. 3.

FIG. 5 is another example of an access network of the switch network of FIG. 3. In FIG. 5, switch network 135 includes three extra switches 505 (including two extra switches to two different redundancy access rows) to include an extra input and output. That is, switch network 135 includes 31 inputs and 25 outputs to communication processing channels in addition to the redundant communication processing channels provided by the redundancy access rows. This results in two of the redundancy access rows having five switches while the other redundancy access rows still have four switches. Switch network 135 can be expanded upon with extra switches to increase the number of inputs and outputs. This is possible due to the uniformity of the architecture of switch network 135.

Figure 6:
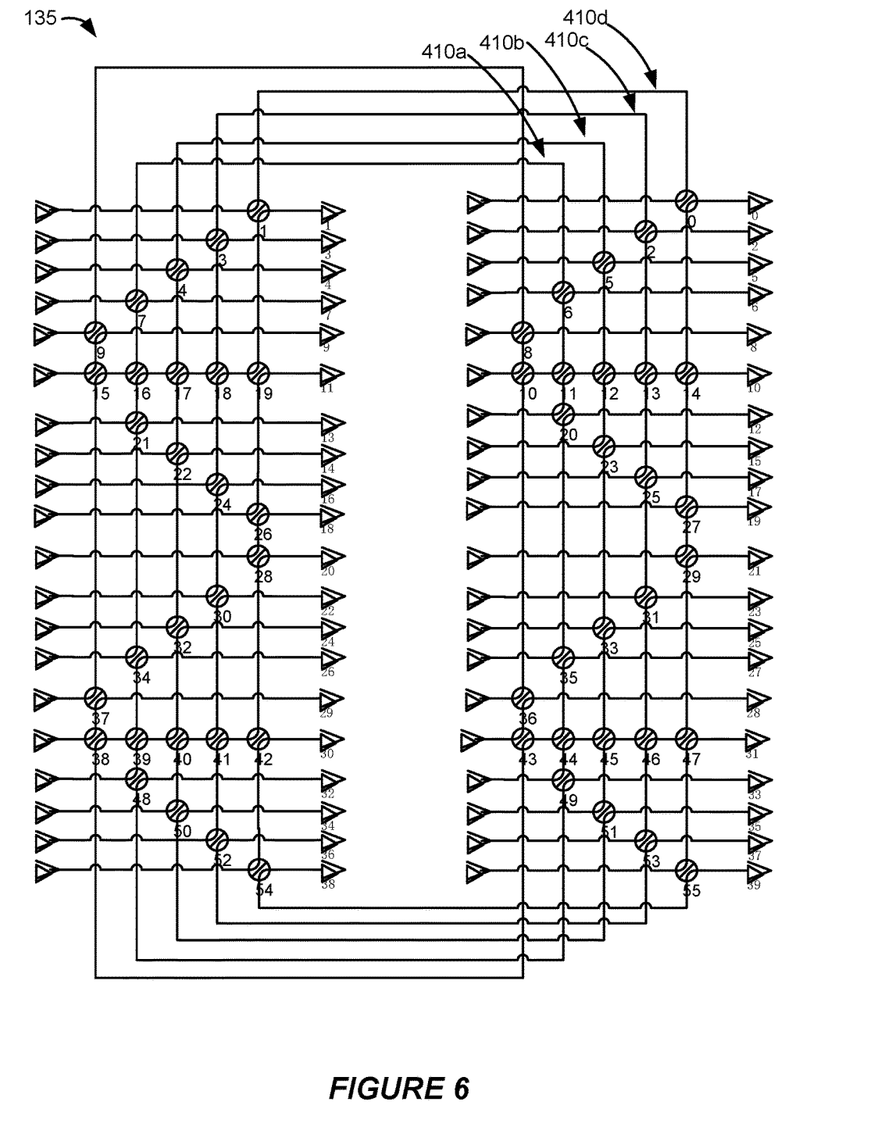
FIG. 6 is another example of an access network of the switch network of FIG. 3.

FIG. 6 is another example of an access network of the switch network of FIG. 3. In FIG. 6, switch network 135 includes four redundancy access rows providing routing and access to four redundant communication processing channels. By contrast to switch network 135 in FIG. 4, some of the redundancy access rows have been removed to reduce the number of switches to implement switch network 135 at the cost of a reduced number of redundant communication processing channels. This implementation can result in an increase in weight savings and cost savings due to the reduced number of switches.

Figure 7:
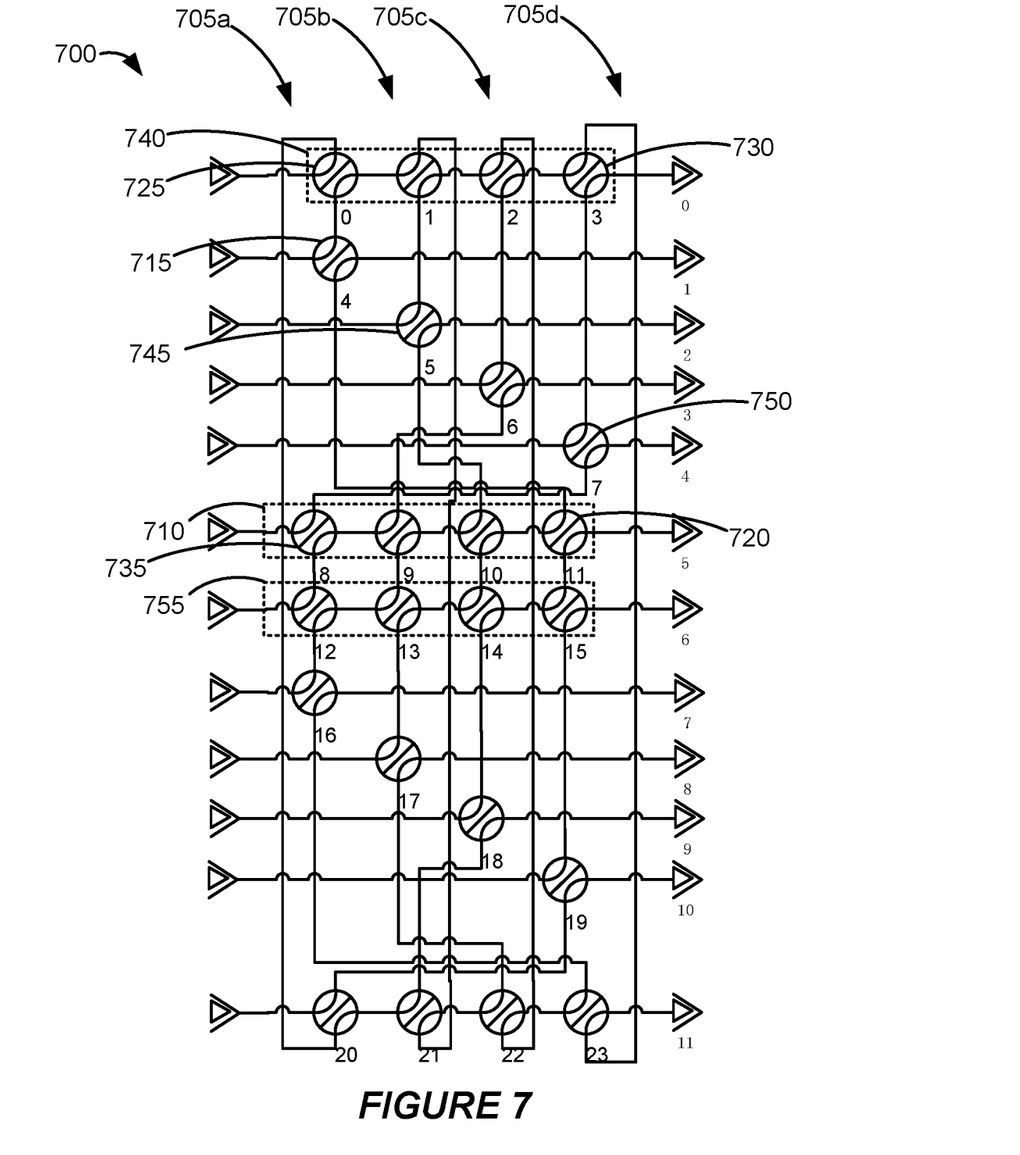
FIG. 7 is an example of an access network with reduced insertion loss.

Signals routed through a switch network, including switch network 135 can experience insertion loss, which is generally proportional to the number of switches through which the signals pass. FIG. 7 is an example of an access network with reduced insertion loss. The illustrated switch network 700 can be implemented as switch network 155 in FIG. 1.

In FIG. 7, switch network 700 includes switches of rings that are alternatively coupled with switches of redundancy access rows such that the number of switches that signals propagate through is reduced. For example, switch 715 of ring 705a is coupled with switch 725 of redundancy access row 740 (i.e., the first switch receiving an input signal) and with switch 720 of redundancy access row 710 (i.e., the last switch providing the input signal to a redundant channel of channels 150). As another example, switch 745 is coupled with the second switch of redundancy access row 740 and the third switch of redundancy access row 710. As another example, switch 750 is coupled with the last switch 730 of redundancy access row 740 (i.e., the switch providing an active signal to channels 150) and switch 735 of redundancy access row 710. Accordingly, switches of the rings are coupled with two switches in the redundancy access rows, each of the switches at different positions within the redundancy active rows.

Additionally, the switches of two redundancy access rows can have their ports coupled with each other. For example, in FIG. 7, switches of redundancy access rows 710 and 755 have ports coupled with each other. Switch networks 700 reduces the amount of insertion loss because its architecture allows for a lower number of switches that a signal must propagate through using the redundancy access rows.

In some implementations, the inactive and active signals can be balanced to different switch networks. That is, some portion (e.g., half) of the inactive signals can be provided to one switch network and another portion (e.g., also half) of the inactive signals can be provided to another switch network. Load balancing (i.e., balancing the active and inactive signals) can provide an efficient solution for avoiding congestion on the inputs and reducing the probability of blocking (i.e., reducing the possibility of an input not being able to be routed to an output).

Figure 8:
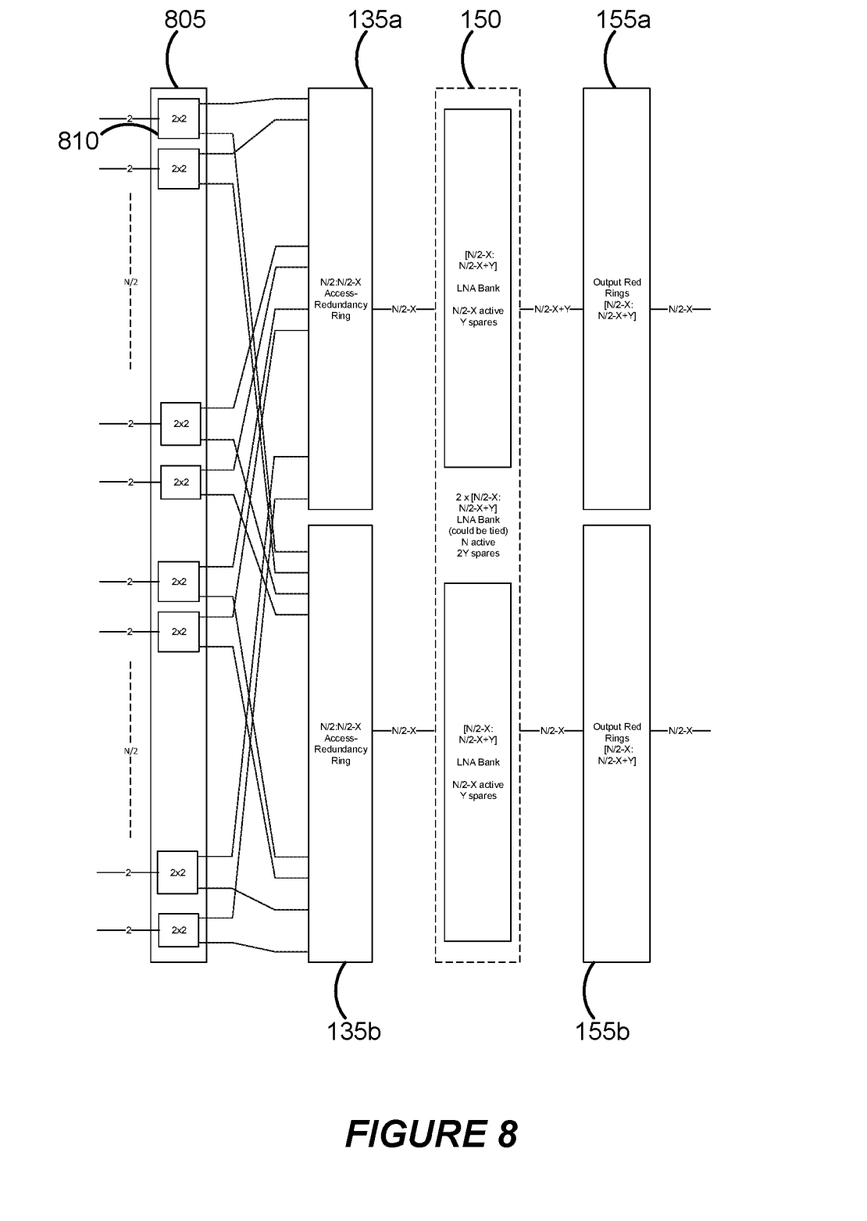
FIG. 8 is an example of a switch network with load balancing.

FIG. 8 is an example of a switch network with load balancing. In FIG. 8, load balancing network 805 includes several switch modules 810 having a 2×2 array of C-switches. C-switches might be used for load balancing networks 805 because they can implement 2×2 arrays of switching elements with relatively low insertion loss. In particular, each of the switch modules 810 provides one input to switch network 135a and one input to switch network 135b. Switch networks 135a and 135b both have access to channels 150 and the outputs of channels 150 can be provided to two separate switch networks 155a and 155b. That is, in FIG. 8, the switch networks can be split into smaller switch networks. By using load balancing network 805, half of the inactive signals can be provided to switch network 135a and the other half of the inactive signals can be provided to switch network 135b. Likewise, half of the active signals can be provided to switch network 135a and the other half of the active signals can be provided to switch network 135b. For example, controller 140 in FIG. 1 can determine which feeds providing inputs to load balancing network 805 are active or inactive, and therefore, route the signals appropriately such that they are balanced.

Figure 9:
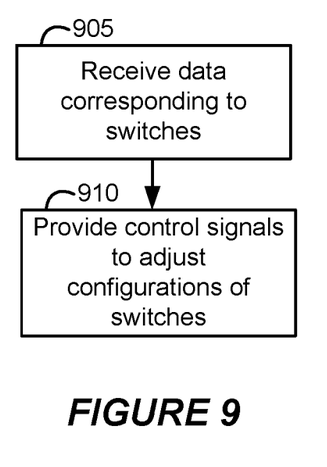
FIG. 9 is an example of a flowchart for operating a switch network.

FIG. 9 is an example of a flowchart for operating a switch network. In FIG. 9, at block 905, data corresponding to electromechanical switches can be received. For example, controller 140 can receive controller input 145 indicating changes to be made to the configuration of switch network 135 and/or switch network 155, for example, by adjusting the angular positions of one or more rotors of the switches. At block 910, control signals to adjust configurations of switches can be provided. For example, controller 140 can generate control signals to be provided to switches of switch network 135 and/or switch network 155 in FIG. 1 so that the configurations are changed to provide the proper routing between inputs and outputs of the switch networks.

Implementations of the subject matter described in this specification may be implemented as one or more computer programs, i.e., one or more modules of computer program instructions, encoded on non-transitory computer readable medium for execution by, or to control the operation of, a data processing apparatus or circuitry, such as, for example, controller 140.

Figure 10:
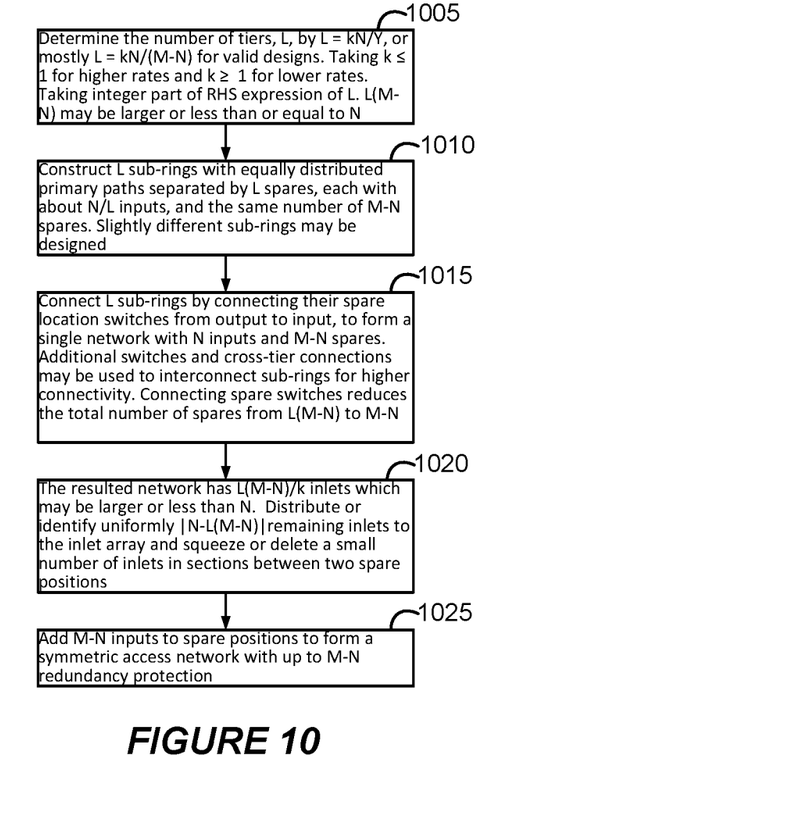
FIG. 10 is an example of a flowchart for designing a switch network.

In some implementations, switch networks can be designed via a systematic and regular design methodology. FIG. 10 is an example of a flowchart for designing a switch network. In FIG. 10, at block 1005, a number of tiers L (e.g., rings) can be determined. For example, in some implementations, L=kN/Y or L=kN/(M−N), where M are inputs, N are outputs (e.g., routed inputs), Y are the number of redundancies, and k is a number based on the design. In designs with higher input to output ratios, k less than or equal to 1 can be useful, and designs with lower ratios can have a ratio greater than or equal to 1. At block 1010, the rings can be designed with L spares, as previously discussed. At block 1015, the switches of the rings can be coupled with the spare switches. At block 1020, the switch network can be modified, for example, based on some of the examples disclosed previously. At block 1025, the redundancy access rows with the spare switches can be provided with inputs to implement a switch network.

Thus, improved switch arrangements have been disclosed. The foregoing merely illustrates principles of the invention. It will thus be appreciated that those skilled in the art will be able to devise numerous systems and methods which, although not explicitly shown or described herein, embody the principles of the invention and are thus within the spirit and scope of the invention as defined by the following claims.

What is claimed is:

1. An arrangement of electromechanical switches, the arrangement having L rings of electromechanical switches and one or more redundancy access rows of electromechanical switches, wherein:
the arrangement is disposed between a plurality of inputs and a plurality of outputs;
each electromechanical switch is either part of a first subset or part of a second subset of the electromechanical switches, each switch in the first subset being included in a respective redundancy access row, and no switch in the second subset of the electromechanical switches being included in any redundancy access row;
each of the one or more redundancy access rows has L electromechanical switches, each of the L electromechanical switches in a respective redundancy access row being directly coupled with at least one other of the L electromechanical switches;
each switch in the second subset of electromechanical switches has a first port coupled to one of the plurality of inputs, a second port coupled to one of the plurality of outputs, and a third port and a fourth port, each respectively coupled to a different switch of the first subset of electromechanical switches;
each of the L rings includes, from each redundancy access row, a respective one of the L electromechanical switches;
each of the L electromechanical switches is coupled with two corresponding electromechanical switches of a respective one of the L rings of electromechanical switches; and
L is at least two.

2. The arrangement of claim 1, wherein connections between the L rings are alternatively coupled to the electromechanical switches of at least one of the redundancy access rows.

3. The arrangement of claim 2, wherein a first redundancy access row includes a first switch coupled to receive an input from an antenna feed and a second switch coupled to a first redundant communication processing channel.

4. The arrangement of claim 3, wherein the first switch is coupled with a switch of a first ring that is coupled to a first communication processing channel, and the second switch is coupled with a switch of a second ring that is coupled to receive an input from an antenna feed.

5. The arrangement of claim 1, wherein the one or more redundancy access rows are positioned between consecutive electromechanical switches of each of the L rings of electromechanical switches.

6. The arrangement of claim 1, wherein the electromechanical switches are R-switches.

7. The arrangement of claim 1, wherein the electromechanical switches are T-switches.

8. A system comprising:
an arrangement of electromechanical switches, the arrangement having outputs coupled with communication processing channels, the arrangement having L rings of electromechanical switches and one or more redundancy access rows of electromechanical switches; and
a controller configured to provide control signals to the electromechanical switches to change a routing of a signal received at an input of the arrangement from a communication processing channel to a redundant communication processing channel of the corresponding redundant communication processing channels, wherein:
the arrangement is disposed between a plurality of inputs and a plurality of outputs;
each electromechanical switch is either part of a first subset or part of a second subset of the electromechanical switches, each switch in the first subset being included in a respective redundancy access row, and no switch in the second subset of the electromechanical switches being included in any redundancy access row;
each of the one or more of the redundancy access rows has L electromechanical switches, each of the L electromechanical switches in a respective redundancy access row being directly coupled with at least one other of the L electromechanical switches;

each switch in the second subset of electromechanical switches has a first port coupled to one of the plurality of inputs, a second port coupled to one of the plurality of outputs, and a third port and a fourth port, each respectively coupled to a different switch of the first subset of electromechanical switches;

each of the L rings includes, from each redundancy access row, a respective one of the L electromechanical switches;

each of the L electromechanical switches is coupled with two corresponding electromechanical switches of a respective one of the L rings of electromechanical switches; and L is at least two.

9. The system of claim 8, wherein connections between the L rings are alternatively coupled to the electromechanical switches of at least one of the redundancy access rows.

10. The system of claim 9, wherein a first redundancy access row includes a first switch coupled to receive an input from an antenna feed and a second switch coupled to a first redundant communication processing channel.

11. The system of claim 10, wherein the first switch is coupled with a switch of a first ring that is coupled to a first communication processing channel, and the second switch is coupled with a switch of a second ring that is coupled to receive an input from an antenna feed.

12. The arrangement of claim 8, further comprising:
a load balancing network configured to balance inactive inputs and active inputs to the arrangement of the electromechanical switches.

13. The arrangement of claim 12, wherein the load balancing network is composed of C-switches.

14. The system of claim 8, wherein the one or more redundancy access rows are positioned between consecutive electromechanical switches of each of the L rings of electromechanical switches.

15. The system of claim 8, wherein the electromechanical switches are R-switches.

16. The system of claim 8, wherein the electromechanical switches are T-switches.

17. A method comprising:
receiving, by a controller, data corresponding to positions of electromechanical switches of an arrangement of electromechanical switches, the arrangement having L rings of electromechanical switches and one or more redundancy access rows of electromechanical switches; and generating, by the controller, control signals to adjust configurations of the electromechanical switches to change routing of signals between inputs and outputs of the arrangement; wherein
the arrangement is disposed between a plurality of inputs and a plurality of outputs;
each electromechanical switch is either part of a first subset or part of a second subset of the electromechanical switches, each switch in the first subset being included in a respective redundancy access row, and no switch in the second subset of the electromechanical switches being included in any redundancy access row;
each of the one or more of the redundancy access rows has L electromechanical switches, each of the L electromechanical switches in a respective redundancy access row being directly coupled with at least one other of the L electromechanical switches;
each switch in the second subset of electromechanical switches has a first port coupled to one of the plurality of inputs, a second port coupled to one of the plurality of outputs, and a third port and a fourth port, each respectively coupled to a different switch of the first subset of electromechanical switches;
each of the L rings includes, from each redundancy access row, a respective one of the L electromechanical switches;
each of the L electromechanical switches is coupled with two corresponding electromechanical switches of a respective one of the L rings of electromechanical switches; and
L is at least two.

18. The method of claim 17, wherein the electromechanical switches are R-switches or T-switches.

* * * * *